US012792782B2

(12) United States Patent
Vinberg et al.

(10) Patent No.: US 12,792,782 B2
(45) Date of Patent: Nov. 10, 2026

(54) APPLICATION PROGRAMMING INTERFACES FOR PRESENTING AND MANAGING TRUST DATA

(71) Applicants: Lars Vinberg, Mountain View, CA (US); Nicolai Wadstrom, Redwood City, CA (US); Erik Starck, Malmö (SE); Shmuel Silverman, Novato, CA (US)

(72) Inventors: Lars Vinberg, Mountain View, CA (US); Nicolai Wadstrom, Redwood City, CA (US); Erik Starck, Malmö (SE); Shmuel Silverman, Novato, CA (US)

(73) Assignee: Bootstrapworks Professional Services, LLC, Redwood City, CA (US)

( * ) Notice: Subject to any disclaimer, the term of this patent is extended or adjusted under 35 U.S.C. 154(b) by 145 days.

(21) Appl. No.: 18/920,305

(22) Filed: Oct. 18, 2024

(65) Prior Publication Data

US 2025/0131132 A1 Apr. 24, 2025

Related U.S. Application Data

(60) Provisional application No. 63/608,949, filed on Dec. 12, 2023, provisional application No. 63/591,600, filed on Oct. 19, 2023.

(51) Int. Cl.
*G06F 21/00* (2013.01)
*G06F 21/64* (2013.01)

(52) U.S. Cl.
CPC .................................... *G06F 21/64* (2013.01)

(58) Field of Classification Search
CPC ........................................................ G06F 21/64
See application file for complete search history.

(56) References Cited

U.S. PATENT DOCUMENTS

| | | | | |
|---|---|---|---|---|
| 9,584,540 | B1 * | 2/2017 | Chan | G06Q 40/03 |
| 9,942,257 | B1 * | 4/2018 | Hitchcock | H04L 63/1433 |
| 10,380,703 | B2 * | 8/2019 | Chrapko | G06Q 10/40 |
| 2008/0072329 | A1 * | 3/2008 | Herschaft | G06F 21/57 726/25 |
| 2019/0378219 | A1 * | 12/2019 | Chrapko | G06Q 10/40 |
| 2023/0142664 | A1 * | 5/2023 | Ackerman | G06F 30/20 706/50 |

(Continued)

*Primary Examiner* — Kendall Dolly
(74) *Attorney, Agent, or Firm* — Aurora Consulting LLC; Kristen J. Hansen; Ashley Sloat

(57) ABSTRACT

Systems and methods are described for determining trustworthiness. The systems and methods may include obtaining a plurality of nodes associated with a first entity, wherein the plurality of nodes correspond to a plurality of additional entities, each the plurality of nodes being defined by both a trust metric and a relationship indication to the first entity or to another of the plurality of additional entities; generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

26 Claims, 11 Drawing Sheets

(56) References Cited

U.S. PATENT DOCUMENTS

| | | | | |
|---|---|---|---|---|
| 2023/0237407 | A1* | 7/2023 | Chrapko | G06Q 10/0635 706/12 |
| 2025/0061307 | A1* | 2/2025 | Tran | G06N 3/045 |
| 2025/0080545 | A1* | 3/2025 | Vinberg | H04L 63/12 |
| 2026/0093213 | A1* | 4/2026 | Darling | G05B 13/028 |
| 2026/0111882 | A1* | 4/2026 | Dickson | G06Q 20/3825 |

* cited by examiner

APPLICATION PROGRAMMING INTERFACES FOR PRESENTING AND MANAGING TRUST DATA

CROSS-REFERENCE TO RELATED APPLICATIONS

This application claims the priority benefit of U.S. Provisional Application No. 63/608,949, filed Dec. 12, 2023 and U.S. Provisional Application No. 63/591,600, filed on Oct. 19, 2023, the disclosures of which are herein incorporated by reference in their entireties.

TECHNICAL FIELD

The present disclosure generally relates to systems and methods for assessing trust between entities, trust in entities, and trust in information.

BACKGROUND

Digital anonymity and uncertainty in identity create opportunities for fraud and deception at an enormous cost today. Examples include disinformation in news and fact reporting, criminal fraud, friction and barriers in international trade, and many more in all aspects of life.

In today's world, communication between entities can be secure in the sense that eavesdropping is preventable, but the entities cannot be sure about the intents of each other nor the content that is exchanged between them. The question is: "Can person 'A' trust person 'B'?" For such an example, there are some conventional tools to establish trust and reduce uncertainty, including managing corporate credentials by using a class of tools trying to establish authentication and identity; performing credit and background checks using a class of tools to condense financial information about people to make financial decisions; and performing general source verification based on existing databases using database search tools employed by using background check tools.

SUMMARY

In some aspects, the techniques described herein relate to a computer-implemented method for modeling trustworthiness of data in real time, the method including: obtaining a plurality of nodes associated with a first entity, wherein the plurality of nodes correspond to a plurality of additional entities, each the plurality of nodes being defined by both a trust metric and a relationship indication to the first entity or to another of the plurality of additional entities; generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

In some aspects, the techniques described herein relate to a computer-implemented method, wherein: each node is a statement or entity associated with the first entity; and the model is a trust network including a plurality of neural networks configured to execute, in parallel, one or more activation functions to generate an aggregated trust metric for the first entity based on the trust metric and the relationship indication associated with each statement or entity.

In some aspects, the techniques described herein relate to a computer-implemented method, further including: receiving, from the first entity, an API request to determine trustworthiness of at least one entity in the plurality of additional entities, the API request including a decay factor; generating, based on the API request and the decay factor, an aggregated trust metric for the at least one entity; and generating a modified view of the model based on the aggregated trust metric.

In some aspects, the techniques described herein relate to a computer-implemented method, wherein the decay factor defines a percentage of trustworthiness according to a depth of a relationship defined between the first entity and at least one of the plurality of additional entities. In some aspects, the techniques described herein relate to a computer-implemented method, wherein the modified view includes a simulated trustworthiness for at least one node in the plurality of nodes, the simulated trustworthiness being biased according to decay factor.

In some aspects, the techniques described herein relate to a computer-implemented method, further including: receiving, from the first entity, an API request to determine trustworthiness of at least one entity in the plurality of additional entities, the API request including at least one attribute; generating, based on the API request and the at least one attribute, an aggregated trust metric for the at least one entity; and generating a modified view of the model based on the aggregated trust metric.

In some aspects, the techniques described herein relate to a computer-implemented method, wherein the modified view includes a simulated trustworthiness for at least one node in the plurality of nodes, the simulated trustworthiness being biased according to the at least one attribute.

In some aspects, the techniques described herein relate to a computer-implemented method, wherein: the aggregated trust metric represents a probability of the first entity being trustworthy; and the simulated trustworthiness modifies the probability. In some aspects, the techniques described herein relate to a computer-implemented method, further including: receiving, from the first entity, an API request to access the representation of the model, transmitting an API response to the first entity, wherein the API response includes configuration information or state information for generating a view of the model in a user interface accessible to the first entity.

In some aspects, the techniques described herein relate to a computer-implemented method, detecting, in the user interface, a requested modification to the view of the model, wherein the requested modification causes a localized change to at least one trust metric associated with at least one node in the plurality of nodes; generating a modified view of the model based on the modification and the localized change to the at least one trust metric; causing display of the modified view of the model in the user interface according to the localized change to the at least one trust metric.

In some aspects, the techniques described herein relate to a computer-implemented method, wherein: the modified view includes a simulated trustworthiness for the at least one node. In some aspects, the techniques described herein relate to a computer-implemented method, wherein modifying the representation of the model according to one or more selectable contexts or attributes associated with one or more nodes of the plurality of nodes includes: biasing at least one trust metric defined for at least one node of the plurality of nodes; and depicting an indication adjacent to the one or more nodes, the indication depicting the bias of the at least one trust metric.

In some aspects, the techniques described herein relate to a computer-implemented method, wherein: the at least one trust metric includes an interaction score or a willingness to interact score for an entity associated with the at least one node in the plurality of nodes; and the generated API enables the first entity to access and modify the representation of the model according to the interaction score or the willingness to interact score.

In some aspects, the techniques described herein relate to a system including: at least one processing device; and memory storing instructions that when executed cause the processing device to perform operations including: obtaining a plurality of nodes associated with a first entity, wherein the plurality of nodes correspond to a plurality of additional entities, each the plurality of nodes being defined by both a trust metric and a relationship indication to the first entity or to another of the plurality of additional entities; generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

In some aspects, the techniques described herein relate to a system, wherein: each node is a statement or entity associated with the first entity; and the model is a trust network including a plurality of neural networks configured to execute, in parallel, one or more activation functions to generate an aggregated trust metric for the first entity based on the trust metric and the relationship indication associated with each statement or entity.

In some aspects, the techniques described herein relate to a system, wherein the operations further include: receiving, from the first entity, an API request to determine trustworthiness of at least one entity in the plurality of additional entities, the API request including a decay factor; generating, based on the API request and the decay factor, an aggregated trust metric for the at least one entity; and generating a modified view of the model based on the aggregated trust metric.

In some aspects, the techniques described herein relate to a system, wherein the operations further include: receiving, from the first entity, an API request to determine trustworthiness of at least one entity in the plurality of additional entities, the API request including at least one attribute; generating, based on the API request and the at least one attribute, an aggregated trust metric for the at least one entity; and generating a modified view of the model based on the aggregated trust metric.

In some aspects, the techniques described herein relate to a system, wherein the operations further include: receiving, from the first entity, an API request to access the representation of the model, transmitting an API response to the first entity, wherein the API response includes configuration information or state information for generating a view of the model in a user interface accessible to the first entity.

In some aspects, the techniques described herein relate to a system, wherein modifying the representation of the model according to one or more selectable contexts or attributes associated with one or more nodes of the plurality of nodes includes: biasing at least one trust metric defined for at least one node of the plurality of nodes; and depicting an indication adjacent to the one or more nodes, the indication depicting the bias of the at least one trust metric.

In some aspects, the techniques described herein relate to a non-transitory computer-readable medium including: at least one processor; and a memory storing instructions that, when executed by the at least one processor, cause the at least one processor to perform operations including: obtaining a plurality of nodes associated with a first entity, wherein the plurality of nodes correspond to a plurality of additional entities, each the plurality of nodes being defined by both a trust metric and a relationship indication to the first entity or to another of the plurality of additional entities; generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

In some aspects, the techniques described herein relate to a non-transitory computer-readable medium, wherein: each node is a statement or entity associated with the first entity; and the model is a trust network including a plurality of neural networks configured to execute, in parallel, one or more activation functions to generate an aggregated trust metric for the first entity based on the trust metric and the relationship indication associated with each statement or entity.

In some aspects, the techniques described herein relate to a non-transitory computer-readable medium, wherein the operations further include: receiving, from the first entity, an API request to determine trustworthiness of at least one entity in the plurality of additional entities, the API request including a decay factor; generating, based on the API request and the decay factor, an aggregated trust metric for the at least one entity; and generating a modified view of the model based on the aggregated trust metric.

In some aspects, the techniques described herein relate to a non-transitory computer-readable medium, wherein the operations further include: receiving, from the first entity, an API request to determine trustworthiness of at least one entity in the plurality of additional entities, the API request including at least one attribute; generating, based on the API request and the at least one attribute, an aggregated trust metric for the at least one entity; and generating a modified view of the model based on the aggregated trust metric.

In some aspects, the techniques described herein relate to a non-transitory computer-readable medium, wherein the operations further include: receiving, from the first entity, an API request to access the representation of the model, transmitting an API response to the first entity, wherein the API response includes configuration information or state information for generating a view of the model in a user interface accessible to the first entity.

In some aspects, the techniques described herein relate to a non-transitory computer-readable medium, wherein modifying the representation of the model according to one or more selectable contexts or attributes associated with one or more nodes of the plurality of nodes includes: biasing at least one trust metric defined for at least one node of the plurality of nodes; and depicting an indication adjacent to the one or more nodes, the indication depicting the bias of the at least one trust metric.

In some aspects, the techniques described herein relate to a non-transitory computer-readable medium, wherein: the at least one trust metric includes an interaction score or a willingness to interact score for an entity associated with the at least one node in the plurality of nodes; and the generated API enables the first entity to access and modify the representation of the model according to the interaction score or the willingness to interact score.

Figure 1:
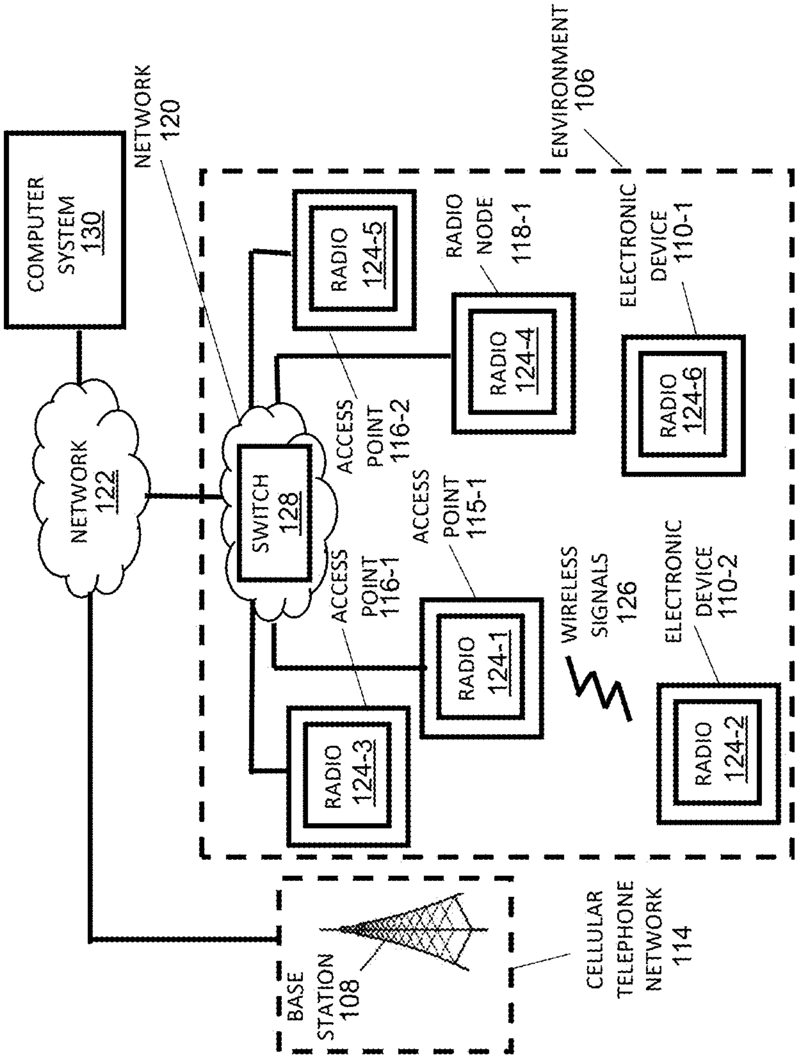
FIG. 1 is a block diagram of an example of communication between electronic devices according to some embodiments of the disclosure.

The illustrated embodiments are merely examples and are not intended to limit the disclosure. The schematics are drawn to illustrate features and concepts and are not necessarily drawn to scale.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete and will fully convey the scope to those of ordinary skill in the art. Like numbers refer to like elements but not necessarily the same or identical elements throughout.

Many of the daily human life and technology interactions (e.g., human to machine, human to human, and/or machine to machine) take place in the digital world of communications where anyone, including ML-based entities, can speak, claim, or generate fraudulent information or content. For example, to train large language models (LLMs), a broad dataset may be scanned and learned using the publicly accessible Internet. There is no way today to distinguish between fraudulent information datasets and coherently truthful datasets. Moreover, there is no way to distinguish between actual known facts and generated, human, or machine-fabricated facts.

Therefore, there is a need for systems and methods that can assess and establish trust metrics and/or trust networks that define trust (or lack of trust) between entities, trust in entities, and trust in information. Such assessments can include analyzing statements, contexts, and/or other input about a particular entity (or statement) to dynamically generate trust models that may be used to understand a level of trust for specific entities, systems, objects, statements, endorsements, data, or the like.

The systems described herein may provide a way for a user to input and model data representing trustworthiness of particular information and to further add, in real time, a representation of a human assessment (or human-machine or machine-based assessment) of a statement, an entity, or a relationship represented in a trust model. For example, the systems described herein may provide access to a data model that enables a human or a machine to dynamically view, modify, and influence trust metrics associated with a trust model. Specifically, the systems described herein may provide a way for a user or machine (or a combination thereof) to input data representing opinions, thoughts, gut feelings, instincts, emotions, prejudices, influence levels, common sense, education level, ability level, or the like and apply that data to nodes and edges of a trust model in the form of contexts and/or relationships in order to ascertain how changes to the trust model affect trust metrics for any of the nodes and/or edges in the trust model (i.e., how changes to the trust model affect trust metrics for any of the statements, entities, and/or relationships in the trust model).

In general, the user of strict digital data can overwhelm human instinct and cognition abilities when a logic assessment pertains to trust. The deepfake construct is one example of a trust scenario than can mislead human cognition. Trust is a context-dependent construct; e.g. the context can overshadow the trust to provide a user with some information that may be used to accurately decipher trust. The systems described herein may provide an advantage over the use of strict digital data to represent trust. For example, the systems described herein may account for human instinct and cognition that is not represented in conventional machine-based logic (e.g., binary logic). Accounting for human instinct and cognition can ensure a way to analyze trust (and build trust) to understand which portions of a particular trust model impact the entire trustworthiness of each element in the model. For example, the systems described herein may establish trust metrics and/or trust networks and may provide access to modify, influence, or otherwise model trust metrics of components within the trust network to reflect how changes to the trust metrics (or changes to nodes of a trust model) may impact trustworthiness from a perspective of a particular user.

As described throughout this disclosure, a trust model may be represented as a graphical network between two or more nodes, where nodes may be entitles, statements, or the like. Nodes may be connected by edges. In some embodiments, an edge may represent a verb followed by a subject-verb-object pattern. Edges may be unidirectional or bidirectional. Edges and nodes can have attributes and contexts that further characterize and provide further specificity to them. For example, an edge connected to an entity may be further characterized by attributes such as statements and/or contexts. Similarly, an edge may be characterized by contexts and trust metrics corresponding to the attributes of the edge or of the nodes connected by the edge. Each context and associated trust metric may also be updated according to additional data or detected changes within a particular trust model.

Such statements, contexts, and/or attributes may also correspond to trust metrics valuating a trustworthiness of those statements, contexts, or attributes being true (e.g., accurate, dependable, trustworthy, etc.). In some embodiments, the trust metrics may represent initial trust metrics provided by a user or system associated with the statements, contexts, and/or attributes. In some embodiments, trust metrics may be updated or otherwise modified by the systems described herein based on additional input available for a trust model. For example, the systems described herein may update initial trust metrics in response to receiving additional data or detecting changes in one or more other nodes, statements, relationships, contexts, attributes, or trust metrics associated with content represented by the trust model.

In some embodiments, the models described herein may be generated according to predefined rules for a particular entity or trust network, as described elsewhere herein. In addition, because trust is not a unidirectional attribute, i.e., the trust perceived by entity 'A' of entity 'B' also depends, in part, on entity 'A', there is an additional need to capture and assess observer influences when assessing and establishing such trust metrics. Accordingly, the models described herein can be generated with a way to influence or bias the model at a later time, such as when additional entities, relationships, and/or statements are added to the model.

As used herein, the term "trust" may represent a confidence level that an entity will, given a certain context, behave predictably. When trust is used as a statement, trust may represent a probability that the statement is true within a certain context. Similarly, the probability that the statement is false within the same context may be represented as the uncertainty attached to a statement in the context. Therefore, dynamic uncertainty may be deduced based on the trust and/or the uncertainty by using the context to bias the uncertainty toward user-selected variables. For example, trust may be numerically represented as a trust metric that may be biased by context, attributes, other trust metrics, user input, machine input, or the like.

In some embodiments, a trust metric may be provided to the systems described herein as a defined portion of an entity or statement. In general, the trust metric may be valued between zero and one, where zero represents no trust and one represents full trust. Trust in a particular system (or person) can infer knowledge of a level of certainty of the system being able to perform an intended action. Similarly, a lack of trust in the system (or person) can infer knowledge of a level of uncertainty of the system being able to perform the intended action. In addition, a system that can evaluate uncertainty can also evaluate trust. Therefore, there is a need for systems and methods to assess uncertainty and enable the performance of uncertainty assessments dependent on a viewer/observer requesting that may bias or otherwise modify factors pertaining to uncertainty and/or trust by providing user-based input. In some embodiments, the user-based input may be included in the trust metrics and/or trust networks described herein. In some embodiments, trust metrics and trust networks are based on machine generated input.

In general, interactions (e.g., digital or physical) between individuals, organizations, and entities can be captured or modeled in a digital twin universe. This digital twin universe may include entities, statements, and the relationship(s) between the entities and other entities, entities and statements and/or statements and other statements. Entities can be, but are not limited to, a person, an object, an organization, a hardware component or system, or a software system (or process), a machine learning (ML) module, or an artificial intelligence (AI) module. A statement can include any declarative statement. In some examples, the statement can be of a specific structure. In some examples, the statement is not limited to a specific statement structure. In the examples described herein, a node may be used to define an entity. Similarly, a node (e.g., or a socket) may be used to define a statement. In addition, a line (or arrow) connecting nodes (e.g., statements to statements, statements to entities, etc.) may represent an edge that defines a relationship between two nodes (e.g., relationships between two statements, relationships between an entity and a statement, etc.).

The examples described herein include a system that uses graph relationships with specific attributes, contexts, and/or rules to generate an uncertainty-based trust model that may be used to assess trustworthiness of particular statements and/or entities. The trust model may include a graphical representation of the relationships pertaining to an entity (or statement). Each graphical portion may include (or be associated with) a metric that valuates a trust (or distrust) between the entity (or statement) and another graphical portion (e.g., other nodes, edges, other entities, other statements, etc.).

The systems and methods described herein may establish trust metrics and/or trust networks and may provide access to modify, influence, or otherwise model trust metrics to reflect how changes to the trust metrics (or changes to nodes of the trust model) may impact trustworthiness from a perspective of a particular user. For example, the systems and methods described herein may enable a user (e.g., a viewer of a trust model) to impact how trust metrics are determined by allowing the user to modify attributes and/or contexts for one or more nodes of a trust model, thereby modifying one or more attributes and/or contexts associated with entities or statements represented in a trust model. In a non-limiting example, the systems described herein may determine and/or modify trust metrics to reflect real time user opinions (e.g., input) on trust. Such opinions may be held by a viewer of a trust model and that viewer (e.g., user) may modify particular attributes and/or contexts according to a belief system, a thought, user knowledge at a point in time, or other information available to the user. For example, real time user input indicating a trust level may be provided with reference to a first node in a trust model. The first node may represent a statement made by a first entity (e.g., a first user) about a second entity (e.g., a second user). The first entity may access a version of the trust model and may choose to modify one or more contexts, attributes, etc. associated with the first entity or another node in the model. The modifications made by the first entity can impact trust metrics generated for one or more nodes in the trust model. A user and/or machine interface may modify attributes and/or contexts in order to modify a trust metric. The systems described herein provide an application programming interface (API) for the user to access and/or modify trust models.

For example, if the first entity has knowledge that the second entity is a colleague of a trusted friend, then the first entity may apply a context or attribute to nodes or connections in the model that include or connect to statements or information about the second entity to indicate the relationship and/or indicate thoughts about the relationship between the first user (e.g., the first entity) and the second user (e.g., the second entity). Specifically, the first user may apply or add (in a view of the trust model) a context to nodes that include statements or information about the second user to increase the trustworthiness associated with the second user. The context may include a relationship indicator associated with increased trustworthiness, for example. The context may be a classifier or may include a direct score that may be applied to the nodes that include statements or information about the second entity. In some embodiments, context may be provided and/or modified by machine interfaces according to a knowledge base of the machine, for example.

In some embodiments, the user may also or instead modify attributes for nodes associated with statements or information about the second entity. In this example, the attribute modification(s) may function to indicate an increased trust in the second entity by the first entity. Such attributes can include relationship indicators, details about the second entity may be entered as a contact or connection to the first entity thus indicating a particular level of predefined trust—e.g., friend, colleague, acquaintance, employer, employee, level or depth of connection through other users, etc.—which may also be increased or decreased from the predefined trust according to the entered and/or modified attributes. In some embodiments, attributes may be provided and/or modified by machine interfaces according to a knowledge base of the machine, for example.

FIG. 1 is a block diagram illustrating an example of communication between electronic devices 110 (such as a cellular telephone, a portable electronic device, or another type of electronic device, etc.) in an environment 106. The environment 106 may be used to view and/or interact with a trust network generated by the techniques described herein. Moreover, electronic devices 110 may optionally communicate amongst one another and/or with the server computer system 130 via a cellular-telephone network 114 (which may include a base station 108), one or more access points 116 (which may communicate using Wi-Fi) in a wireless local area network (WLAN) and/or radio node 118 (which may communicate using LTE or a cellular-telephone data communication protocol) in a small-scale network (such as a small cell). For example, radio node 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio node 118 may be included in one or more networks, such as: a WLAN, a small cell, a local area network (LAN) and/or a cellular-telephone network. In some embodiments, access points 116 may include a physical access point and/or a virtual access point that is implemented in software in an environment of an electronic device or a computer.

Furthermore, electronic devices 110 may optionally communicate with computer system 130 (which may include one or more computers or servers and which may be implemented locally or remotely to provide storage and/or analysis services and may be programmed with any one of the models generated by the systems and methods described herein and/or NNs 820 described herein) using a wireless or wired communication protocol (such as Ethernet) via network 120 and/or 122. Note that networks 120 and 122 may be the same or different networks. For example, networks 120 and/or 122 may be a LAN, an intranet, or the Internet. In some embodiments, the wired communication protocol may include a secured connection over transmission control protocol/Internet protocol (TCP/IP) using hypertext transfer protocol secure (HTTPS). Additionally, in some embodiments, network 120 may include one or more routers and/or switches (such as switch 128).

Electronic devices 110 and/or computer system 130 may implement at least some of the operations in the techniques described herein. Notably, as described further below, a given one of the electronic devices (such as electronic device 110-1) and/or computer system 130 may perform at least some of the analysis of data associated with the electronic device 110-1 (such as first detection of a new peripheral, communication via an interface, a change to software or program instructions, a change to a DLL, a change to stored information, etc.) acquired by an agent executing in an environment (such as an operating system) of the electronic device 110-1, and may provide data and/or first-detection information to computer system 130.

In some embodiments, the computer system 130 represents a server computing system while electronic devices 110 represent client computing systems. In some embodiments, the computer system 130 represents a client computing system while electronic devices 110 represent server computing systems. Any or all of computer system 130 and electronic devices 110 may be programmed with one or more neural networks (NNs) 20 described herein.

Figure 2:
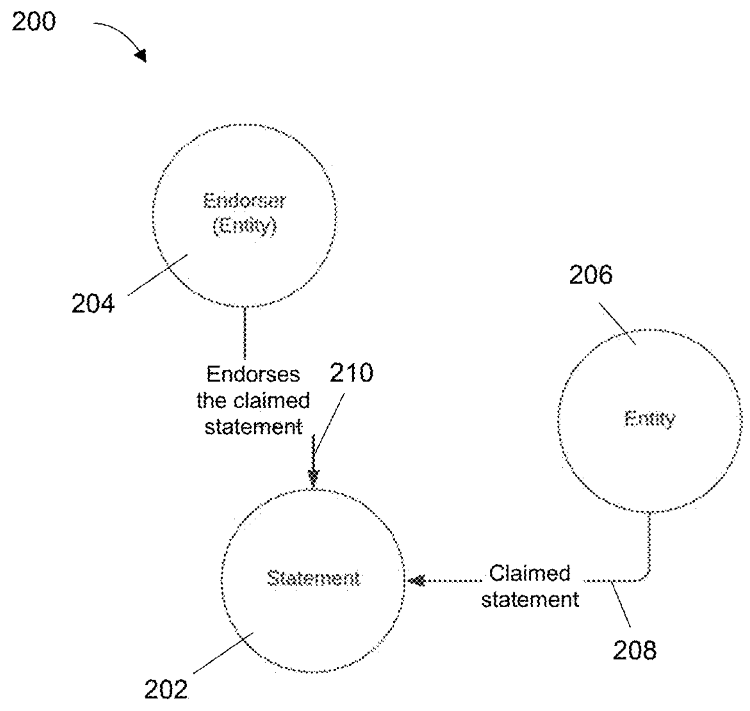
FIG. 2 is a block diagram illustrating an example of a trust model depicting an entity, a claimed statement, and an endorser according to some embodiments of the disclosure.

FIG. 2 is a block diagram illustrating an example of a trust model 200 depicting an entity node 206, a statement node 202, and an endorser node 204, according to some embodiments of the disclosure. The trust model 200 represents an example of a statement endorsement and confirmation. The systems and methods described herein may perform a process to confirm a claimed statement 208 associated with the statement 202 was made by the entity 206. The confirmation may determine and/or score, for example, the trustworthiness of the entity 206 having made the statement 202 (and/or the trustworthiness of the statement 202). The determination of the trustworthiness may include a trust metric representing a particular level of trust or confidence in the entity 206 and/or the statement 202.

For example, a statement (e.g., represented by statement node 202) may be initially unconfirmed and may represent a textual or spoken language statement regarding an object or entity made by an entity associated with entity node 206 and an edge (e.g., claimed statement 208) connecting the entity 206 to the statement 202). Another entity (e.g., represented by endorser entity node 204) can endorse the statement 202 to show support or a particular trust level of this statement. Whether or not to support a statement is up to the entity choosing to support it, yet it may represent a type of edge connection (e.g., edge 210).

Endorsement of a statement can be aggregated into statement strength (e.g., score, metric) to indicate a level of trustworthiness of the statement. Example statement strength may be indicated using an increase or decrease in a trust metric associated with the particular statement. For example, increasing the trust metric for a statement may increase the level of trustworthiness of the statement. Similarly, decreasing the trust metric for the statement may decrease the level of trustworthiness of the statement. The level of trustworthiness may be system or trust-model specific and could be defined as the level of trust assigned to a particular statement, entity, or relationship.

Endorsement of an entity or relationship can be aggregated into entity or relationship strength (e.g., score, metric)

to show the level of trustworthiness of the entity or relationship. Example entity or relationship strength may be indicated using an increase or decrease in a trust metric associated with the particular entity or relationship. For example, increasing the trust metric for an entity may increase the level of trustworthiness of the entity. Increasing the trust metric for a relationship may increase the level of trustworthiness of the relationship.

Figure 3:
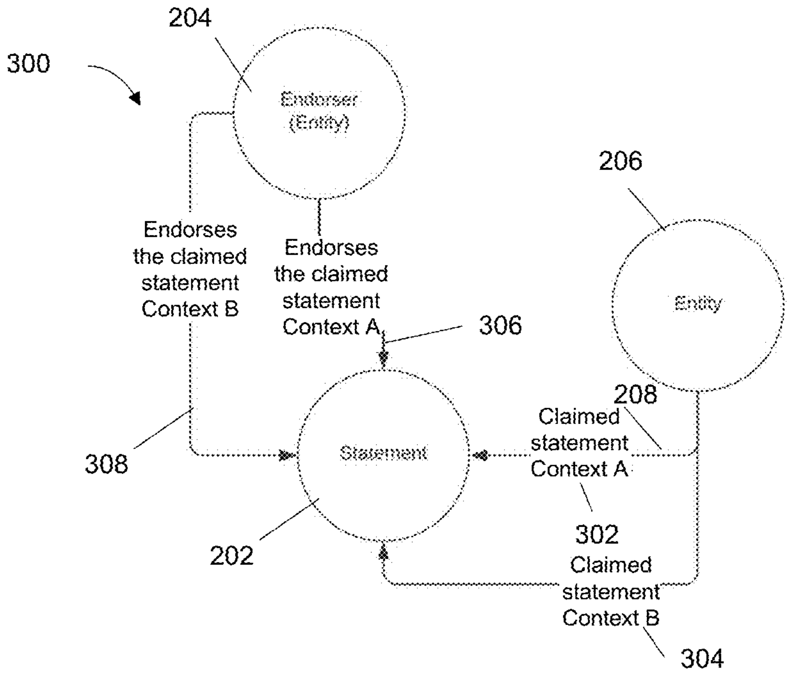
FIG. 3 is a block diagram illustrating the model of FIG. 2 with additional contexts, according to some embodiments of the disclosure.

FIG. 3 is a block diagram illustrating the trust model of FIG. 2 with additional contexts, according to some embodiments of the disclosure. For example, a model 300 includes a first context 302 shown as a context that may be applied to statement 202. A second context 304 is shown as another context that may be applied to statement 204. The contexts 302, 304 may be applied alone or in combination.

The endorser entity node 204 can represent an entity that may endorse 306 the statement 202 according to the context 302 to show support or a particular trust level of the statement 202 in view of the context 302. Similarly, the entity representing the endorser entity node 204 can endorse 308 the statement 202 according to the context 304 to show support or a particular trust level of the statement 202 in view of the context 304.

While the views of the trust models described herein are depicted in two-dimensional form, one skilled in the art will appreciate that trust models and views of such models may be depicted to a user in three-dimensional form and thus interactions with such three-dimensional forms of the trust models may also be performed in all three dimensions. For example, from a user perspective, the user may pan, zoom, tilt, and move the view of the trust model in three dimensions as if the user were moving around between nodes within the model. Such a view enables the user to view size-based changes in trust impact. For example, the systems described herein may modify statement dimensions, entity dimensions, and/or edge dimensions based on respective changes that occur in the respective trust metrics of such dimensions.

Figure 4:
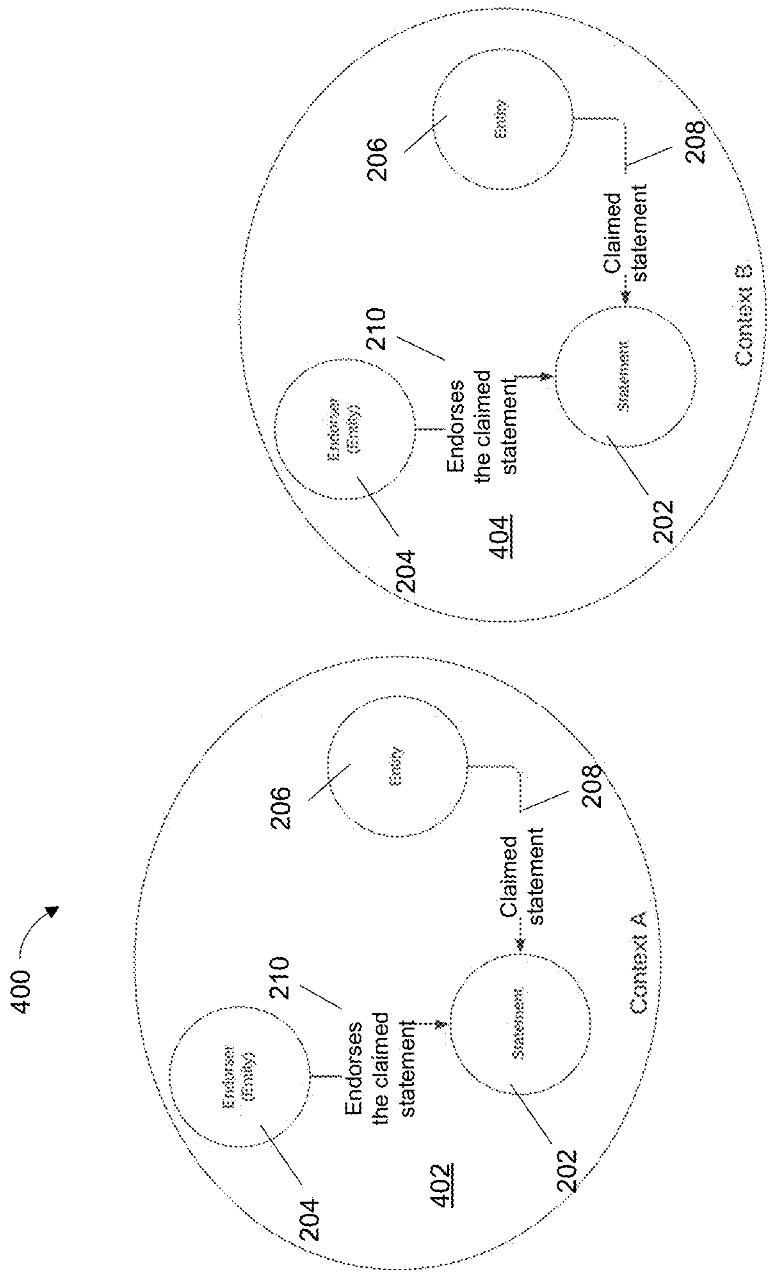
FIG. 4 is a block diagram illustrating an example view for defining contexts, according to some embodiments of the disclosure.

FIG. 4 is a block diagram illustrating an example view 400 for defining contexts, according to some embodiments of the disclosure. In this example, the context 302 and context 304 are depicted as independent networks/models 402, 404 that may be apply contexts independently. Generating views of the trust model as independent contexts may simplify a model by removing edges and endorsements that may pertain to other contexts.

Applying individual contexts to a particular trust model can provide insight into how each context 302, 304 impacts trust without the influence of another context. Multiple contexts may impact the trust model. The systems described herein provide a way to decouple contexts by enabling a way to view changed in the trust model according to each context and/or according to two or more contexts and/or according to an order of application of two or more contexts.

Figure 5:
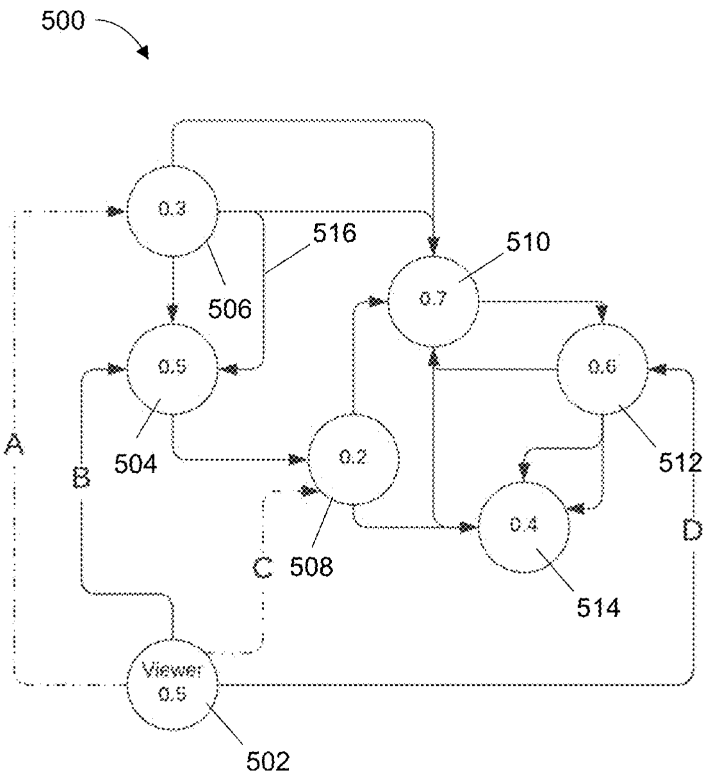
FIG. 5 is a block diagram illustrating an example view of a trust model accessed by a viewer that is represented in at least one node of the trust model, according to some embodiments of the disclosure.

FIG. 5 is a block diagram illustrating an example view 500 of a trust model accessed by a viewer that is represented in at least one node 502 of the trust model, according to some embodiments of the disclosure. For example, the node 502 may represent a user (e.g., a viewer) that is accessing an API provided by the systems described herein to view and assess a trust model. In this example view 500 includes a number of nodes (e.g., node 502, node 504, node 506, node 508, node 510, node 512, node 514) connected via edges (e.g., edge 516, etc.). Each node 502-514 includes a trust metric defining a level of trust for one or more claims (e.g., statements) associated with a particular node (e.g., entity) or edge (e.g., relationship) with respect to the viewer node 502. Each trust metric (e.g., trust metric 0.7 for node 510) may be modified directly or via a change in one or more contexts, weights (associated with trust metrics of other nodes), and/or a change in one or more relationships. Such changes may be applied by a user to evaluate trust between the viewer node 502 and one or more of the other nodes 504-514.

The trust metrics (e.g., trust metric 0.7 of node 510) may be calculated in real time and can be impacted by a user (e.g., viewer) associated with node 502. As an example, the viewer can modify the view 500 by adding new links A, B, C, and D, or may remove one or more links to ascertain how the trust of nodes or the overall trust model is impacted by such modifications. The viewer can also choose specific contexts or modify existing link values (representing relationships between nodes) such as link values associated with link B and/or link D to determine (and visually view) trust metric changes associated with particular nodes 502-514. For example, the API provided by the systems described herein can allow a user to access a trust model, perform modifications to trust metrics, contexts, and/or relationship link values and visually see how trust metrics change. Specifically, the API provides access to a data model and that allows a human or a machine to dynamically view, modify, and influence trust metrics based on changes to the underlying trust model.

The API may allow for the selection of nodes in a trust model and the ability to modify attributes of a node or edge before constructing a requested view of the trust model. For example, a trust model may be stored in a first configuration and users may access the trust model in a different configuration based on any attributes that the user (or machine) requested to be changed. In some embodiments, the API may begin depicting a view of the trust model as the stored view and may allow the user to modify nodes, relationships, contexts, and/or attributes. In some embodiments, the API may generate and provide questions to the user to enable such changes to a trust model before presenting a view of the trust model. For example, the API may change a time or a distance attribute to soften or harden trust relationships of distance, time, or other contextual variables. In some embodiments, questions may pertain to determining which other users, nodes, statements, etc. are to be included in a particular trust model.

In some embodiments, the ability to manipulate one input for a node, edge, context, attribute, etc. may enable the user to view trust and other values associated with any of the components of the trust model depending on the manipulation in the input. Privacy settings and security algorithms may also be applied to ensure such changes follow any rules of the system and/or API. In some embodiments, a change in a trust metric value or attribute may result in a local trust model update for a specific view being accessed by the user. In general, changes in a local view of a trust model may not impact the underlying system until specifically incorporated by the viewer. That is, viewing and modifying trust metrics for nodes, edges, contexts, and attributes of the nodes and edges may be sandboxed from a master version of the trust model. Such sandboxing may provide the user privacy to modify a view without publicly changing the view for other users of the API or system.

A number of different applications may access the API (e.g., API engine 824) to use the data model (e.g., data model 828) for viewing and modifying a trust model (e.g., trust model 805). For example, a rating service application may use the data model 828 to define a rating to be a type of a claimed statement (e.g., statement). The actual value of the rating may be determined as a multiplication between a trust metric (e.g., a value between zero and one) of the claimer (e.g., an entity) and a value of the rating (e.g., a value between zero and one). This determination may ensure that an entity deemed to have high trustworthiness can provide a stronger (i.e., a more trustworthy) claimed statement (e.g., rating value in this example). In the case of rating, the viewer (e.g., user) of the API may view or modify rating values provided by the user, but may not modify rating values provided by other users. Thus, the user may be able to view how her personal ratings of a product or service impact the overall rating of the product or service.

Figure 6:
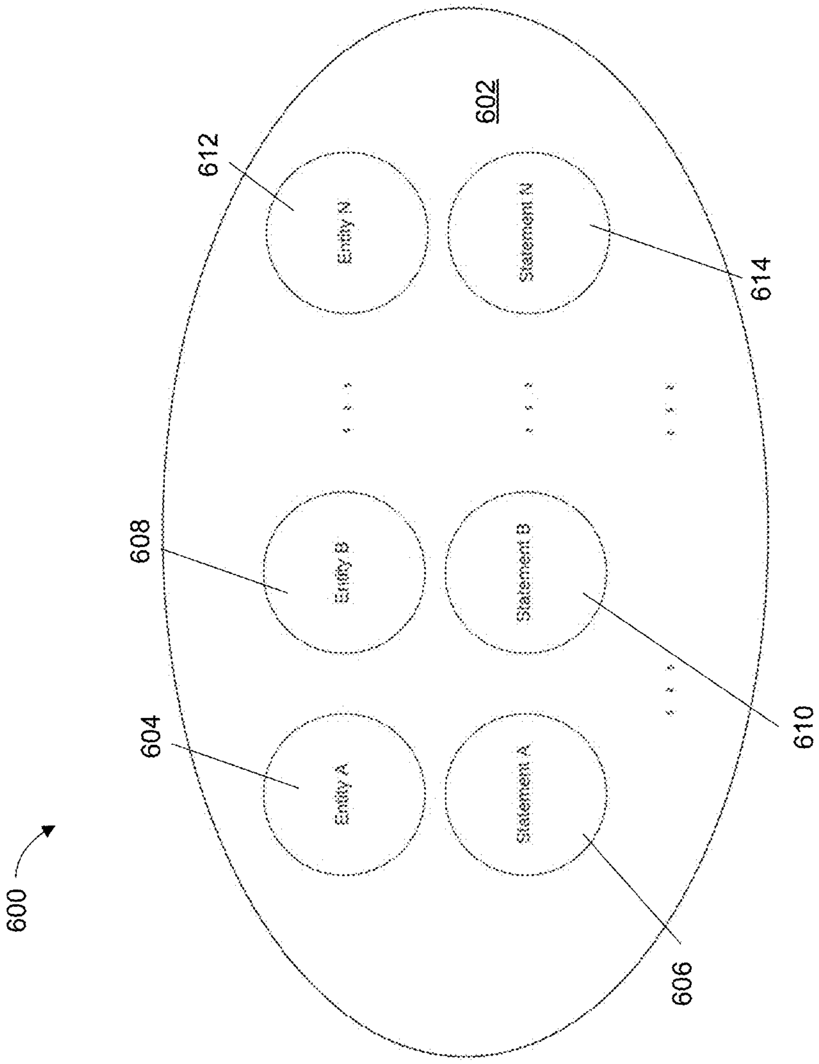
FIG. 6 is a block diagram illustrating an example group of nodes in a trust model, according to some embodiments of the disclosure.

FIG. 6 is a block diagram illustrating an example of a group 602 of nodes in a trust model, according to some embodiments of the disclosure. The ability to group nodes may provide for a user or an application to refer to multiple entities and/or statements at once. Operations may be performed to impact a group of nodes at a given time (e.g., in a near simultaneous or a simultaneous fashion). As shown, the nodes in group 602 include an entity A 604, a statement A 606, an entity B 608, a statement B 610, an entity N 612, and a statement N 614. However, any number of statements and/or entities (or other nodes) may exist within a single group. In addition, nodes may be included in multiple groups at any given time. Group selection can be user-defined. Groups are generally private to the user (or application) that generated the groups. Therefore, groups may be viewed and managed by the user or the application associated with a specific user. An example of use of grouping is to bring all entities that are my close friends together into a group that names close friends and sets a trust level in the friend entities (e.g., nodes) to be 100%. In some embodiments, the trust level for specific entities may be set by the user or other system based on available information about the specific entities.

Figure 7:
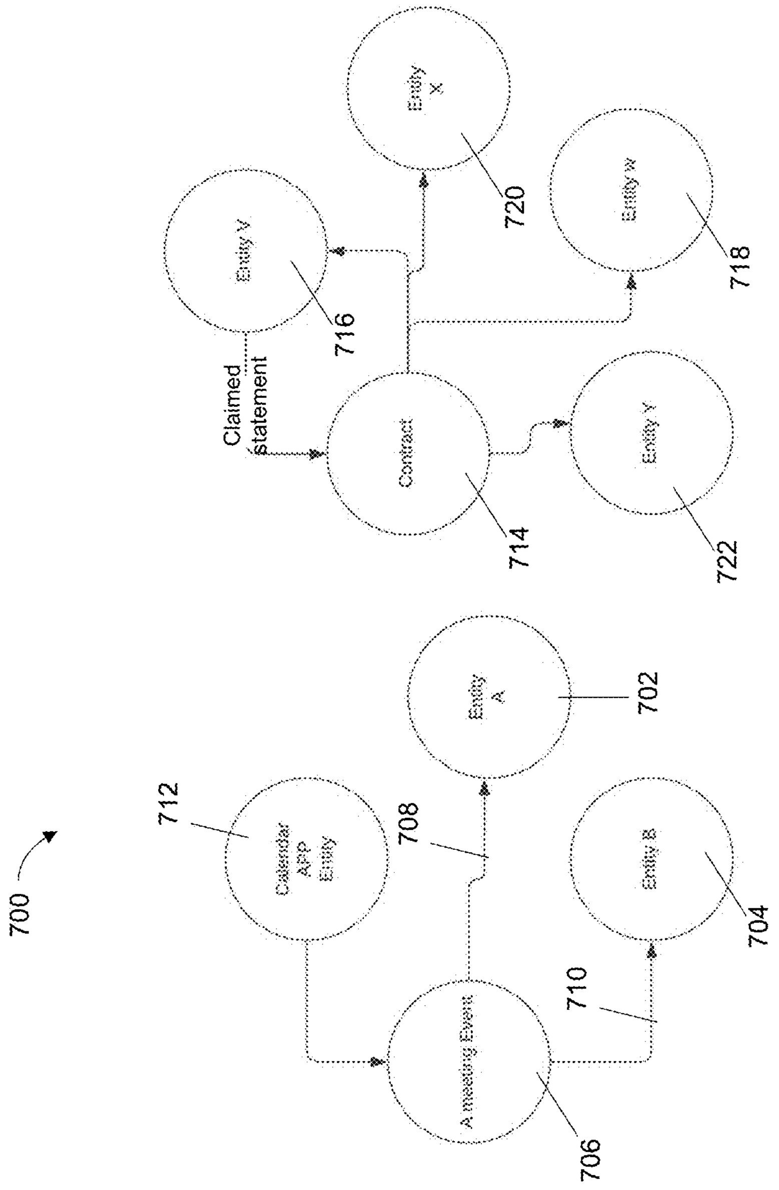
FIG. 7 is a block diagram illustrating an example view of scheduling an example event between at least two entities, according to some embodiments of the disclosure.

FIG. 7 is a block diagram illustrating an example view 700 of scheduling an example event between at least two entities, according to some embodiments of the disclosure. In this example, an event scheduling application (e.g., a calendar application, a video conferencing application, etc.) may access the API and data models described herein to schedule or participate in an interaction between one or more entities (e.g., entity A of node 702 and entity B of node 704). The event is represented as a statement node 704 indicating a meeting event. The event scheduling application may schedule the meeting event in the system where entity A of node 702 and entity B of node 704 and may show an edge 708 connecting node 702 to the event node 706 and an edge 710 connecting the node 704 to the event node 706. The entities of nodes 702, 704 can respond by claiming something regarding the event (e.g., participating in event or a statement about the event) to further connect the meeting event node 706 to the scheduling application entity associated with node 712.

In some embodiments, the view 700 may further extend this concept such that an application or an entity can post a statement that represents a contract at node 714 between multiple other entities (e.g., entity V of node 716, entity W of node 718, entity X of node 720, and entity Y of node 722) and connect those other entities of nodes 716-722 with the contract or agreement node 714. This connecting act may enable the other entities of nodes 716-722 to obtain visibility into the statements/agreements/contracts and be able to respond with claims (e.g., statements) such as approving this contract, agreeing, or disagreeing, and any other claims in which the application allows a response. In this example, the API may allow for these dynamic definitions to be set by the application, while the API is agnostic and thus may be used as a platform for the application.

Figure 8:
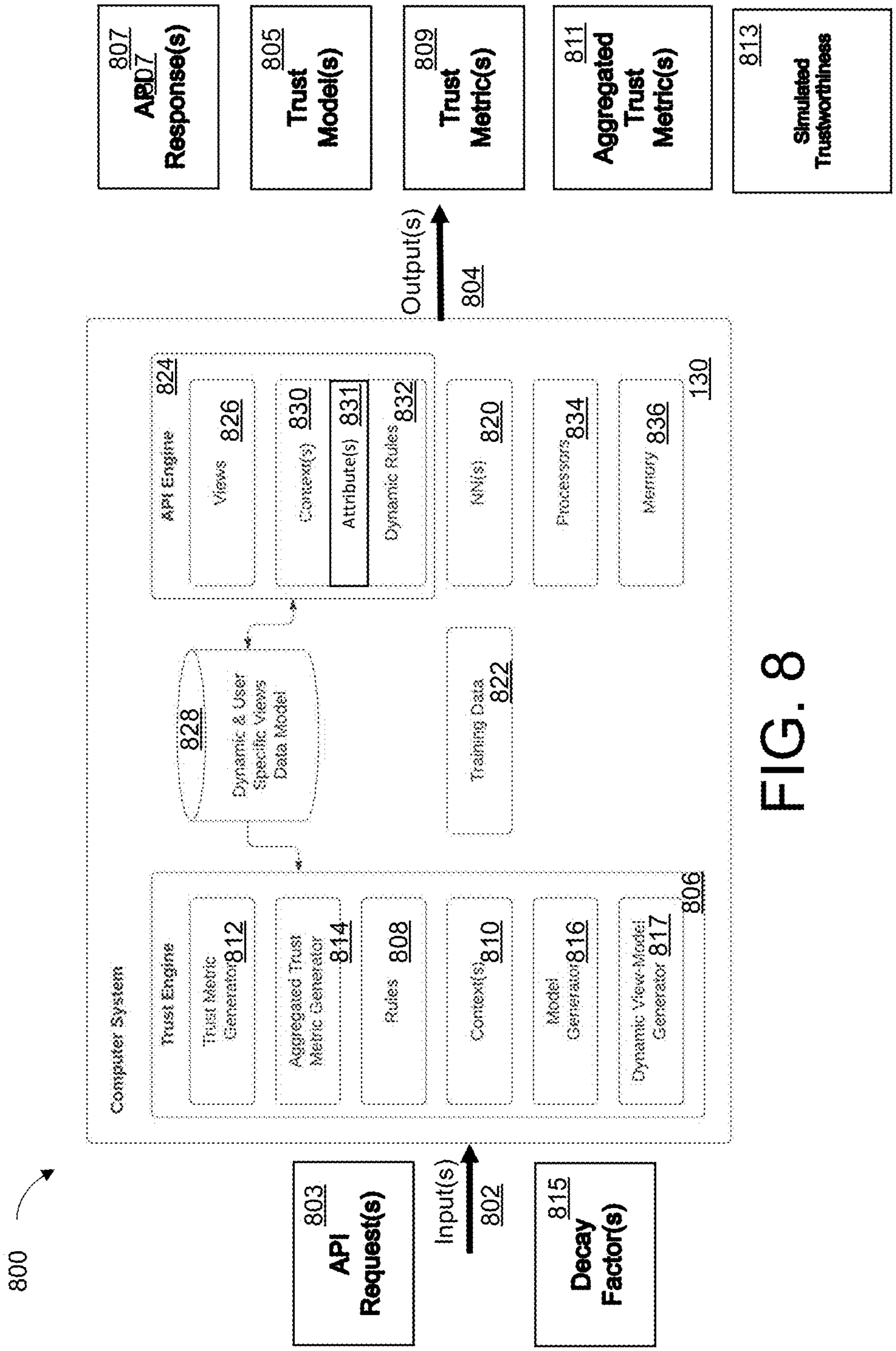
FIG. 8 is a block diagram of an example computer system for generating trust models and generating Application Programming Interfaces (APIs) to access trust models, according to some embodiments of the disclosure.

FIG. 8 is a block diagram of a computer system 800 for generating trust models and generating Application Programming Interfaces (APIs) to access trust models, according to some embodiments of the disclosure. The system 800 may include a computer system (e.g., computer system 130 as described herein). The system 800 may use inputs 802 to generate outputs 804 such as trust models 805, trust metrics 809, aggregated trust metrics 811, simulated trustworthiness 813, API responses 807 responsive to API requests 803 received by system 130. The trust models 805 may be used by a user or a machine to assess and determine trust (e.g., trustworthiness) of entities and statements. In some embodiments, the trust models and associated trust metrics can be used to assess and determine trust between the entities and statements, determine trust between the entities and other entities, and/or determine trust between the statements and other statements.

The system 800 may include a trust engine 806 for managing and performing computations on data from which trust metrics can be extracted and/or generated. The data my include statements and or relationship data that may be assessed according to agreement based trust corresponding to an entity agreeing with output received from another entity, community based trust which corresponds to an experience of a community of entities that are interrelated, and/or association based trust corresponding to a relationship type between the two entities.

The trust engine 806 may include logic and generators for computing trust metrics, aggregated trust metrics, and trust models for assessing a trustworthiness of any number of nodes (e.g., entities, statements, etc.) of a particular trust network (e.g., trust model). The logic may include rules 808 and contexts 810 that may be applied to nodes representing entities, statements and/or relationships amongst the nodes to generate and/or modify trust metrics associated with the trust model. In some embodiments, the rules 808 and/or contexts 810 may be predefined by the system 800. In some embodiments, the rules 808 and/or contexts 810 may be influenced, modified, or updated according to one or more learning inputs, model inputs, and/or attributes. In some embodiments, the learning inputs, model inputs, and/or attributes may be received as an input from a user. In some embodiments, the learning inputs, model inputs, and/or attributes may be received as input from a computing device communicatively coupled to computer system 130.

The trust engine 806 may also include a trust metric generator 812 and an aggregated trust metric generator 814. The trust metric generator 812 may function to generate one or more metrics between zero and one which may represent a trust level for particular entities, statements, or edges as indicated by any number of entities associated with the particular entities, statements, or edges. In some embodiments, the trust metrics may be received as input 802 to the system rather than generated by the system. Updated trust metrics may be updated by trust metric generator 812 when additional data is available.

The aggregated trust metric generator 814 may function to aggregate the trust metrics associated with each node, statement, entity, edge, etc. to generate an aggregated trust metric for a generated trust model. The aggregated trust metric may represent an indication of trust (e.g., a trust level) of a particular entity based on the trust metrics identified/generated for each statement, node, edge, or other entity having a defined relationship (e.g., edge connection) to the particular entity.

The trust engine 806 may further include a model generator 816. The model generator 816 may generate trust models representing a trust network generated on behalf of one or more of the entities/nodes in the model. For example, a model may represent a trustworthiness (or a lack of trustworthiness) of a first entity given a plurality of trust metrics captured/generated for other nodes/entities having defined relationships with the first entity. The trust engine 806 may further include a dynamic view model generator 817. The dynamic view model generator 817 may generate localized views of trust models representing a trust network via the API engine 824, for example.

The system 800 may include one or more neural networks (NNs) 820 (e.g., associated with one or more machine learning models). The NNs 820 may include one or more activation functions executable on various nodes within a particular model. Each NN 820 may represent a neuroevolutionary model that includes at least one network and/or activation function that may be evolved based on competition between populations of neural networks (NNs) all trying to achieve a particular goal (or set of goals), such as identifying trustworthiness of one or more node, entity, or statement. The NNs 820 may be trained using training data 822.

The system 800 may include user interface (UI) generator (depicted here as an API engine 824) for generating visual output 804 representing the trust models 805, trust metrics 809, and/or relationships amongst nodes, entities, and statements described herein. The API engine 824 may generate any number of views 826 (e.g., user interfaces) depicting trustworthiness levels, modeled relationships and/or trust metrics associated with such relationships. The views 826 may be retrieved from dynamic and user specific views data model 828 and modified to assess trustworthiness of particular nodes and edges in a trust model.

The API engine 824 further includes contexts 830 that may be used by a user accessing a view 826 to influence, modify, or otherwise assess trust of a particular node or edge in the trust model. The API engine further includes dynamic rules 832 that may represent rules imposed by the API engine 824. For example, in addition to rules 808 of the trust engine 806, additional rules 832 may be applied by the API engine 824 when receiving input for updating views 826 of a particular trust model. The API engine 824 further includes attributes 831 that may be used by a user accessing a view 826 to influence, modify, or otherwise assess trust of a particular node or edge in the trust model.

The system 800 can include one or more processor(s) 834 and memory 836. The processor(s) 834 may include one or more hardware processors, including microcontrollers, digital signal processors, application specific integrated circuit (ASIC), a field programmable gate array (FPGA) or other programmable logic device, discrete gate or transistor logic, discrete hardware components, or any combination thereof designed to perform the functions described herein and/or capable of executing instructions, such as instructions stored by the memory 836. The processors 834 may also be able to execute instructions for performing communications amongst computer system 130, NNs 820, API engine 824, and trust engine 806, and/or external computing device that are communicatively coupled to system 130.

The memory 836 can include one or more non-transitory computer-readable storage media. The memory 836 may store instructions and data that are usable in combination with processors 834 to execute algorithms/processes described herein, machine learning models and NNs 820, and API engine 824, and/or other applications (not shown) or application programming interfaces (not shown). The memory 836 may also function to store or have access to the trust engine 806, inputs 802, and/or outputs 804.

The system 800 may further include or be communicatively coupled to input devices (not shown) and/or output devices (not shown) to allow users to interface with the system 130.

In operation, the system 130 may receive or obtain inputs 802 and use the inputs 802 to generate outputs 804. Example inputs may include statements, trust metrics, contexts, rules or the like. Example outputs may include API responses 807, trust models 805 for assessing trustworthiness, updated trust metrics 809, aggregated trust metrics 811, user interfaces, model views 826, maps or graphs depicting trustworthiness of statements or entities, and/or other representation of trust-based metrics.

Although system 800 is shown within computer system 130 in FIG. 8, in some embodiments, the trust engine 806 may be independent from API engine 824. The dynamic view model generator 817 may provide a mechanism to generate a view 826 that represents trust in the eyes of the viewer (e.g., user of node 502). Generating the view 826 may include recalculating one or more trust metrics 809 based on changes in inputs 802 related to a plurality of entities or claims (e.g., statements) within the current model. In some examples, the viewer (e.g., user) may not be an entity in the system/model, but must have access to view information related to the nodes. Any context 830 or attribute 831 that is also editable by the viewer based on predefined permissions can also be modified by the viewer and cause an immediate update of their view according to the changed context 830 or attributes 831.

In general, the trust models 805 may represent live, real time systems in which any changes/additions/deletions/updates of contexts 830 and/or attributes 831, connections, entities, claims/statements may impact the current view provided by the system 130 and also the specific view 826 by the viewer. Any changes by the viewer can be limited to a view accessible to the viewer and may not be available or accessed by other users using system 130 and/or API engine 824. Such localized views may be referred to as private views that may be accessed in a private mode while other views stored on system 130 and accessible to other users may be referred to as general views or global views accessed in a general mode. Any changes in a general mode will impact the global model, while changes in a private mode may impact the private view of the model without impacting or modifying the global model. As part of the interface is exposed by the API engine 824, a private view may be pushed to become a general view, with the assumption that the user or the system that operates on this view is authorized to do so.

The API engine allows for multiple views and multiple view types to be generated in real-time by the dynamic view model generator 817. The input to the dynamic view-model generator may be received by the model generator 816, for example, from within the trust engine 806 and using updates and/or data from the dynamic user specific views data model 828.

Figure 9:
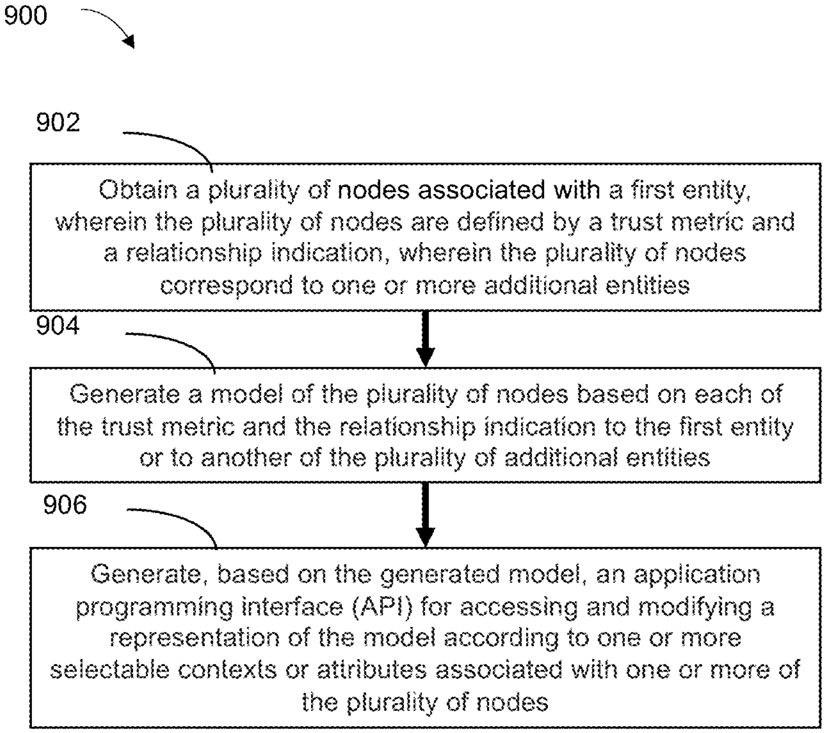
FIG. 9 is an example flow diagram of an example process for generating APIs to access graphical trust models for determining and modeling trustworthiness of data in real time, according to some embodiments of the disclosure.

FIG. 9 is an example flow diagram of a computer-implemented process 900 for generating one or more APIs to access trust models 805 for determining and modeling trustworthiness of data in real time, according to some embodiments of the disclosure. The processes described herein represent computer-implemented methods that can be executed on the system of FIG. 1 (e.g., on the computer system 130), for example. The computer system 130 may include any or all of the components depicted in FIG. 8. One skilled in the art will appreciate that other components and/or duplicative components to system 130 may also be used to carry out the steps of the process 900.

At block 902, the process 900 may include obtaining a plurality of nodes (e.g., nodes 504-514) associated with a first entity (e.g., node 502). The plurality of nodes 504-514 may correspond to a plurality of additional entities that are represented by the nodes 504-514. Each of the nodes 504-514 may be defined by both a trust metric 809 (e.g., trust score) and a relationship indication (e.g., edge score) to the first entity (e.g., node 502) or to another of the plurality of additional entities represented by the nodes 504-514.

At block 904, the process 900 may include generating a trust model 805 of the nodes 502-514 based on each of the trust metric 809 and the relationship indication (e.g., edge 516) to the first entity (e.g., of node 502) or to another of the plurality of additional entities (e.g., of nodes 504-514). For example, the trust engine 806 may generate the trust model 805 for nodes 502-514 and any associated edges between such nodes 502-514.

In some embodiments, each node 502-514 may be a statement or entity associated with the first entity of node 502, for example. In such examples, the model may be a trust network including a plurality of NNs 820 that may execute, in parallel, one or more activation functions associated with each node to generate an aggregated trust metric 811 for the first entity based on the trust metric 809 and the relationship indication (e.g., edge) associated with each statement or entity.

In some embodiments, modifying the representation of the trust model according to one or more selectable contexts 830 or attributes 831 associated with one or more nodes of the plurality of nodes includes biasing at least one trust metric defined for at least one of the plurality of nodes 504-514 and depicting an indication (e.g., a trust metric 809) adjacent to the one or more nodes 502-514. The indication may represent the bias of the at least one trust metric on the trust of a node or the overall trust network/model.

At block 906, the process 900 may include generating, based on the generated trust model 805, an application programming interface (API) 807 for accessing and modifying a representation (e.g., a view 826) of the model 805 according to one or more selectable contexts 830 or attributes 831 associated with one or more of the plurality of nodes 502-514.

In operation, the process 900 may include receiving, from the first entity, an API request 803 to access the representation of the model 805 and transmitting an API response 807 to the first entity. The API response may include configuration information or state information for generating a view 826 of the model 805 in a user interface accessible to the first entity. The process 900 may further include detecting, in the user interface, a requested modification to the view 826 of the model 805. The requested modification may cause a localized change to at least one trust metric 809 associated with at least one node in the plurality of nodes 502-514. The process 900 may further include generating a modified view of the model 805 based on the modification and the localized change to the at least one trust metric 809 and may cause display of the modified view of the model in the user interface according to the localized change to the at least one trust metric 809. In some embodiments, the modified view represents a simulated trustworthiness for the at least one node in the nodes 502-514.

In some embodiments, the process 900 includes receiving, from the first entity, an API request 803 to determine trustworthiness of at least one entity in the plurality of additional entities associated with nodes 502-514, for example. The API request 803 may include at least one context 830. The process 900 may further include generating, based on the API request 803 and the at least one context 830, an aggregated trust metric 811 for the at least one entity and generating a modified view of the trust model 805 based on the aggregated trust metric 811. In some embodiments, the modified view includes a simulated trustworthiness 813 for at least one node in the plurality of nodes 504-514 where the simulated trustworthiness 813 is biased according to the at least one context 830. In some embodiments, the aggregated trust metric 811 represents a probability of the first entity of node 502, for example, being trustworthy and the simulated trustworthiness 813 modifies the probability.

In some embodiments, the process 900 includes receiving, from the first entity, an API request 803 to determine trustworthiness of at least one entity in the plurality of additional entities associated with nodes 502-514, for example. The API request 803 may include at least one decay factor 815. The process 900 may further include generating, based on the API request 803 and the at least decay factor 815, an aggregated trust metric 811 for the at least one entity and generating a modified view of the trust model 805 based on the aggregated trust metric 811. In some embodiments, the modified view includes a simulated trustworthiness 813 for at least one node in the plurality of nodes 504-514 where the simulated trustworthiness 813 is biased according to the at least one decay factor 815. The decay factor 815 may define a percentage of trustworthiness according to a depth of a relationship defined between the first entity and at least one of the plurality of additional entities. For example, if a first entity trusts a second entity, then the decay factor may indicate a number of entity connections that begin from the second entity in which to continue to apply the trust weight associated with the relationship (e.g., edge) from the first entity to the second entity. That is, a decay factor can indicate that a trust model should be apply a trust metric associated with the second entity node to one or more nodes connected to the second entity node or entities connected beyond the second entity node. In another example of operation, the process 900 may include receiving, from the first entity, an API request 803 to access the representation of the model 805 and transmitting an API response 807 to the first entity. The API response may include configuration information or state information for generating a view 826 of the model 805 in a user interface accessible to the first entity. The process 900 may further include detecting, in the user interface, a requested modification to the view 826 of the model 805. The requested modification may cause a localized change to at least one trust metric 809 associated with at least one node in the plurality of nodes 502-514. The process 900 may further include generating a modified view of the model 805 based on the modification and the localized change to the at least one trust metric 809 and may cause display of the modified view of the model in the user interface according to the localized change to the at least one trust metric 809. In some embodiments, the modified view represents a simulated trustworthiness for the at least one node in the nodes 502-514.

In some embodiments, the process 900 includes receiving, from the first entity, an API request 803 to determine trustworthiness of at least one entity in the plurality of additional entities associated with nodes 502-514, for example. The API request 803 may include at least one attribute 831. The process 900 may further include generating, based on the API request 803 and the at least one attribute 831, an aggregated trust metric 811 for the at least one entity and generating a modified view of the trust model 805 based on the aggregated trust metric 811. In some embodiments, the modified view includes a simulated trustworthiness 813 for at least one node in the plurality of nodes 504-514 where the simulated trustworthiness 813 is biased according to the at least one attribute 831. In some embodiments, the aggregated trust metric 811 represents a probability of the first entity of node 502, for example, being trustworthy and the simulated trustworthiness 813 modifies the probability.

Figure 10:
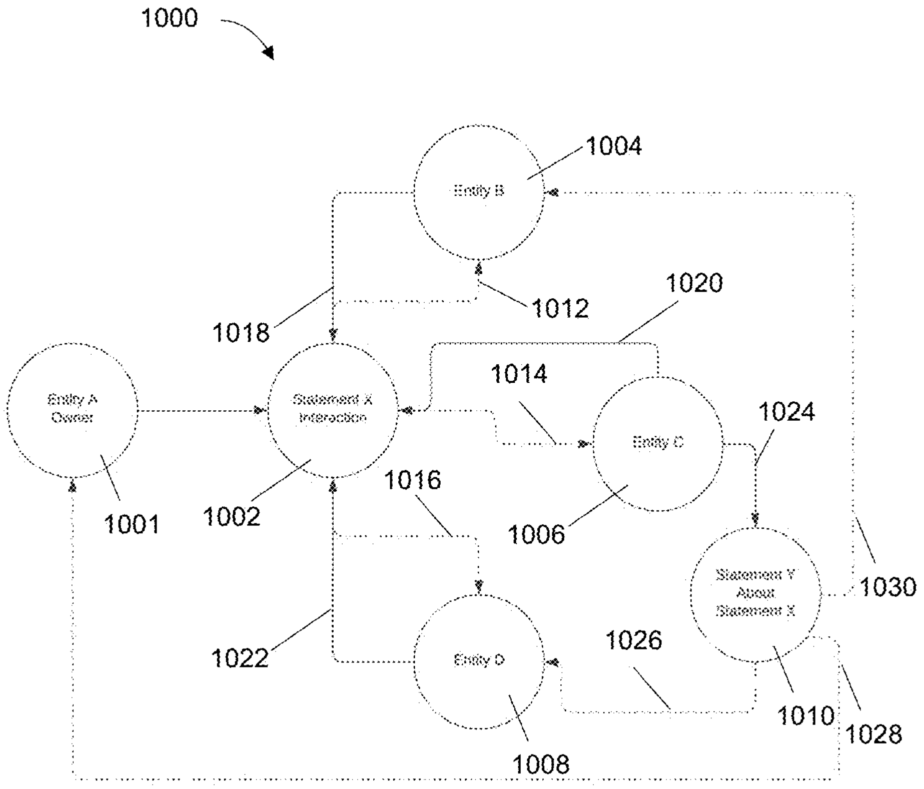
FIG. 10 is a block diagram of an example trust model depicting interactions amongst entities.

FIG. 10 is a block diagram of an example trust model 1000 depicting interactions amongst entities. The trust model 1000 may include any number of interactions amongst entities represented in the model. The interactions may be captured by or occur within a particular application accessed by users that may be represented as entities in the examples described herein. For example, interactions that include meeting requests may include emails, initiation of a meeting request, acceptance of a request, decline of a request, statements and/or agendas, or the like, which are accessed and/or responded to by the entities in the examples described herein. Example interactions may include any communication, agreement, or connection between entities including, but not limited to transactions, meetings and meeting requests, contracts, offers co-creation efforts, connection requests and/or confirmations, conversations and/or documented (e.g., electronic) conversations (e.g., emails, chats, text messages, voice recordings, transactions via electronic signature, etc.), auctions, negotiations, and/or statements.

As shown in trust model 1000, an entity A 1001 is an owner of a particular transaction/interaction (e.g., statement X interaction 1002) in a first node. Other nodes include an entity B 1004, an entity C 1006, an entity D 1008, and a statement Y 1012 (about statement X). In particular, a user associated with entity A 1001 is an owner of the example transaction of model 1000. In the example transaction, the entity A 1001 issued a notification about the transaction (e.g., statement X interaction 1002) to entity B 1004, entity C 1006, and entity D 1008, as shown by respective arrows 1012, 1014, and 1016. For example, the respective arrows 1012, 1014, and 1016 represent entity A 1001 notifying entity B 1004, entity C 1006, and entity D 1008 about the statement X (and any details associated with statement X), which may also associate each notified entity 1004-1006 with the statement X in the trust model 1000.

The entities 1004-1006 may respond, react, or ignore the notification/associated of statement X. If an entity acknowledges, reacts, responds, or otherwise interacts with the received notification indicated by arrows 1012, 1014, or 1016, endorsements or other connections (between the entities 1004-1006 and statement X) may be generated accordingly in the model 1000. For example, an arrow 1018 pointing back to statement X 1002 indicates that entity B 1004 acknowledged the notification of arrow 1012. In addition, an arrow 1020 pointing back to statement X 1002 indicates that entity C 1006 acknowledged the notification of arrow 1014. Similarly, an arrow 1022 pointing back to statement X 1002 indicates that entity D 1008 acknowledge the notification of arrow 1016.

In some embodiments, one or more of the entities 1004-1006 may generate one or more new statements about the statement X 1002. In this example, a user associated with entity C 1006 made the statement Y 1010 about statement X 1002, as indicated by arrow 1024. The statement y 1010 about statement x 1002 may be provided to each entity of the model 1000 and the model 1000 may be updated to indicate an association between the new statement y 1010 and the specific entity 1004, entity 1006, or entity 1008, as shown by respective arrow 1026, arrow 1028, and arrow 1030. Although a single additional statement Y 1010 is depicted, any number of statements can be added to trust model 1000 in a similar fashion. In some embodiments, one or more entities 1004-1006 may generate a meeting. For example, a user associated entity A 1001 may use a meeting application to generate a meeting request with a statement about the type of meeting. The request may be sent to entity B 1004, entity C 1006, and entity D 1008 and each entity 1002-1008 may be associated in a trust model.

Each interaction regarding the meeting can be captured by the systems described herein, which may also generate a trust value for each entity based on data available to the system 800, for example. The trust metric for each entity 1002-1008 may be based on prior (e.g., historical) contracts, prior transactions, prior interactions, prior offers, or the like as performed by entities according to data available to the system 800. Such trust metrics may measure entity interaction and/or entity willingness to interact, Entity A 1002 may use the generated trust metrics, for example, to evaluate interactions with particular entities 1004-1008. The system 800 may be used to assist the evaluation of interactions by determining probabilities and/or outcomes of future interactions (e.g., responses, behaviors, attendance, etc. of particular entities) associated with prior interactions by such entities. For example, the trust metric associated with an interaction may include an interaction score that (a) indicates and/or measures a prior behavior of interaction for a user associated with an entity associated with a particular node and/or (b) indicates and/or determines a likelihood of interaction behavior for the user associated with the entity of the particular node.

In general, when handling structured and unstructured data from many different data sources and turning that data into an asset that can be consumed by user-facing applications in real time or fed to an artificial intelligence (AI) model for training, the systems described herein may maintain attribution of the data, maintain a level of trust in the data, and provide for an access policy. For example, system 800 may determine and maintain attribution of the data received by the system 800 by attributing creation of the data, editing activities associate with the data, and the like. The system 800 may use the attribution to build the trust graphs described herein and/or ensure that the trust graphs comply with the access policies. The system 800 may also determine the level of trust in the data by determining which users/entities endorsed the data, validated the data, modified the data, etc. This determination may indicate an extent or level in which the data can be trusted by the system 800 and/or users of the system 800.

In a non-limiting example, the trust engine 806 may assess an accuracy of an AI model (e.g., one or more NNs 820) performance. The assessment may include determining an accuracy level of the model reading text from a document. The trust engine 806 may determine an uncertainty about if the reading was performed accurately. A source of truth may be used to compare the reading performance to the actual content in the text. The trust engine 806 may perform a comparison between the performance the source of truth to determine a confidence level in the ability of the model to read the document, or text in general, accurately. This confidence level may be used to generate a model of the statements read by the model as compared to the content/words in the actual statements. Other users may also provide a vote on whether the content was read accurately, which may cause an increase or decrease in the applied confidence levels of the model. The system 800 may generate a UI version of this assessment which may be modified to experiment on how particular inputs may modify an end result or trustworthiness of a conclusion gleaned from the model. For example, the system 800 may generate a model representing the assessment and may generate, based on the model, an API to allow a user to access and modify a representation of the model according to any number of selectable contexts or attributes represented in the model.

In another non-limiting example, an article in a newspaper may include a latest financial report for a company. A source of truth exists to determine whether the content was reported correctly, however, the question of trust is in the confidence that a user may have in the journalist/newspaper correctly reporting the financial report. In this example, the system 800 may assess prior stories that the journalist wrote and/or stories published by the newspaper on the same topic or another topic. The assessment may be used to determine a confidence level in the journalist/newspaper, which may be extrapolated to the article in question. The system 800 may generate a UI version of this assessment which may be modified to experiment on how particular inputs may modify an end result or trustworthiness of a conclusion gleaned from the model. The UI version may be based on a model or view similar to the graphs depicted herein (e.g., model 300 of FIG. 3). For example, the system 800 may generate a model representing the assessment and may generate, based on the model, an API to allow a user to access and modify a representation of the model according to any number of selectable contexts or attributes represented in the model.

In another non-limiting example, an article in a newspaper may include analysis about a company and related profitability in the future. A source of truth exists to determine whether such analysis is true or false, but the article is written and thus, the question of trust is in the confidence of a user (or group of users) may have in the analysis being correct. In this example, the system 800 may assess other stories or output about the success or financial acumen of the company, public records, or the like to determine a confidence level in the accuracy of the analysis, which may be extrapolated to the analysis in the article. The system 800 may generate a UI version of this assessment which may be modified to experiment on how particular inputs may modify an end result or trustworthiness of a conclusion gleaned from the model. The UI version may be based on a model or view similar to the graphs depicted herein (e.g., model 300 of FIG. 3). For example, the system 800 may generate a model representing the assessment and may generate, based on the model, an API to allow a user to access and modify a representation of the model according to any number of selectable contexts or attributes represented in the model.

In yet another non-limiting example, a well-known firm may generate a report about the future of a particular market. In this example, a source of truth does not exist and any number of different conclusions may be drawn. The question of trust is in the confidence a user may have in the projection being probable. In this example, the system 800 may assess prior reports, individuals at the firm, the firm history, and/or other metric associated with the firm. The assessments may be used to determine a confidence level in one or more of such metrics. The confidence level may be extrapolated to portions of the report to assess whether each portion is more or less likely to occur. The system 800 may generate a UI version of this assessment which may be modified to experiment on how particular inputs may modify an end result or trustworthiness of a conclusion gleaned from the model. The UI version may be based on a model or view similar to the graphs depicted herein (e.g., model 300 of FIG. 3). For example, the system 800 may generate a model representing the assessment and may generate, based on the model, an API to allow a user to access and modify a representation of the model according to any number of selectable contexts or attributes represented in the model.

The system 800 may perform assessments to analyze attribution and trust of particular data. For example, the trust engine 806 may attribute a segment of information to a source entity, an owner entity and/or a contributor entity. The attribution may be found using a fingerprint mechanism. A fingerprint may represent a value that identifies the information segment content without revealing the content. An example of a fingerprint for a binary resource is an MD5 hash. The goal is for fingerprints to recognize an approximate match as well as an exact match. To avoid back tracking of a fingerprint to identities (i.e., to keep the privacy of the attribution), the trust engine 806 may also use a formula to mix between multiple adjacent segments. The trust engine 806 may further assign and/or compute various metrics to such entities, to help a user of the information to understand the credibility of the information.

In such examples, the trust engine 806 may add an attribution object model to a graph. Each information segment in the attribution object model may be an entity. For example, an example attribution object model may include a segment. In some embodiments, the segment may be a document, which can have multiple versions, and each version can be broken down into subsegments. Each segment may have a fingerprint that identifies the segment content without revealing the content. An example of a fingerprint for a binary resource is an MD5 hash. A fingerprint lookup database may be used in such examples as a mechanism for converting a fingerprint into a segment entity ID. Once an attribution model is in place as a base layer, various trust and credibility metrics can be introduced. In some embodiments, an access policy may be provided in such models as another layer that is linked to the base layer and indicates who may view fingerprint details.

In a non-limiting example, a metric assessed by the trust engine 806 may include a reputation score. The reputation score metric may account for: a number entities in a graph/model, a connection between any or all of the entities, the interactions occurring between entities. The reputation score metric may include one or more scores that quantify an entity's social standing based on such connections and interactions. This reputation score metric may allow the scored reputation of an entity or source to contribute indirectly across multiple layers of connections and interactions of the model.

In general, each entity may have a reputation score that is a positive number less than 1. The trust engine 806 may summarize a reputation score for all connections and all interactions between entities. In some embodiments, the reputation score metric may be expressed as shown in equation [1]:

$$1-1/(\text{sum}(\text{reputation})+1) \quad [1]$$

resulting in a value between 0 and 1 and asymptotic to the upper bound as the social standing grows.

Scores can be adjusted each time a calculation is executed across a graph. In some embodiments, calculations may be executed intermittently or on a schedule including, but not limited to daily, weekly, monthly, ad-hoc at user request, ad-hoc at system 800 request, or the like. For the reputation score metric, such a calculation may be performed over larger time frames since a reputation is not typically determined using an instant determination or instant change. Metrics typically stabilize over time. In some embodiments, the trust engine 806 may tune one or more metrics by weighting parameters that make up reputation in order to ensure accurate influence is placed on a particular node in the graph. In the case of reputation, indirect influence can be culled to limit the influence of other nodes that are beyond three or four levels of indirection.

In some embodiments, trust may be assessed using a trust-based view. For example, consider a three dimensional view in which each entity or statement or relationship is expressed with nodes and links between the nodes. The link expresses a percentage number as trust that represents a strength or weight of this specific node will extend to the other node(s). The node shows a colors or values for the total weighted average of the trust going into this specific node. In this example, the trust is calculated using equation [2] below.

$$\text{Weighted Trust} = \text{Trust of Node}(1) * \text{Trust of Node}(2) \quad [2]$$

Figure 11:
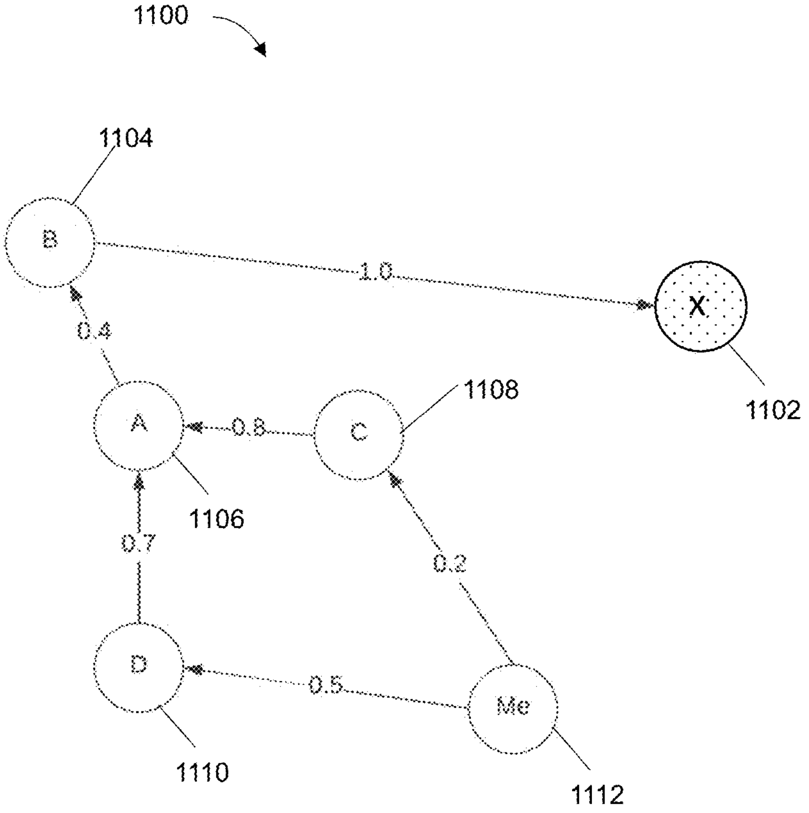
FIG. 11 is a block diagram of an example trust model viewed from a perspective of a single node.

For example, in FIG. 11, a model 1100 is depicted that includes a number of nodes. The nodes in this example in include node X 1102, node B 1104, node A 1106, node C 1108, node D 1110, and node Me 1112. One or more nodes 1102-1112 may have a relationship with another one or more nodes, as indicated by the arrows in FIG. 11. These relationships may be scored by trust engine 806 to generate a trust value. For example, a trust value between node X 1102 and node B 1104 is indicated as 1.0. Similarly, a trust value between node B 11024 and node A 1106 is indicated as 0.4, a trust value between node A 1106 and node C 1108 is indicated as 0.8, a trust value between node A 1106 and node D 1110 is indicated as 0.7, a trust value between node C 1108 and node Me 1112 is indicated as 0.2, and a trust value between node D 1110 and node Me 1112 is indicated as 10.5. Arrows indicated the direction of extension of trust.

In this example, if the trust of node Me 1112 is 0.3 and the trust that node Me 1112 extends to node C is 0.2, then the weighted trust that node C 1108 receives is 0.2*0.3=0.06. In this example, assume that the current view of model 1100 is such that the trust on node B 1104 is 70% and a user is interested in buying a product associated with node X 1102, which is stated by B as being 100% (e.g., fully trustworthy), then the trust value of node B 1104 is 0.7*1.0=0.7 e.g. 70%. The question of a purchasing user may be 'what will happen if my trust of node D 1110 drops from 0.5 to 0.1?'. In this view, the purchasing user can assess such a question by modifying the trust value of D from 0.5 to 0.1 to view how the change in trust influences the model view. The purchasing user may also view how changes in other entities' trust influence the user's view and thus the user's decision to trust what is node B 1104 purports and if the user should indeed purchase the product associated with node X 1102.

In some embodiments, the user may utilize the model to modify other nodes trust metrics to view how the trust metrics change. In some embodiments, the user may utilize the model to modify their own views/opinions and/or trust metrics to view their own influence on the overall model. In some embodiments, the user may utilize the model to modify their own trust metrics and other users' trust metrics to view the combined influence on the overall model.

The systems and methods of the embodiments and variations described herein can be embodied and/or implemented at least in part as a machine configured to receive a computer-readable medium storing computer-readable instructions. The instructions may be executed by computer-executable components integrated or in communication with the system 800, for example, and one or more portions of the processor on or in communication with the control device and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component may be a general or application-specific processor, but any suitable dedicated hardware or hardware/firmware combination can alternatively or additionally execute the instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method for modeling trustworthiness of data in real time, the method comprising:

obtaining a plurality of nodes associated with a first entity, wherein the plurality of nodes correspond to a plurality of additional entities, each the plurality of nodes being defined by both a trust metric and a relationship indication to the first entity or to another of the plurality of additional entities;

generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

2. The computer-implemented method of claim 1, wherein:

each node is a statement or entity associated with the first entity; and the model is a trust network comprising a plurality of neural networks configured to execute, in parallel, one or more activation functions to generate an aggregated trust metric for the first entity based on the trust metric and the relationship indication associated with each statement or entity.

3. The computer-implemented method of claim 1, further comprising:

receiving, from the first entity, an API request to determine trustworthiness of at least one entity in the plurality of additional entities, the API request including a decay factor, generating, based on the API request and the decay factor, an aggregated trust metric for the at least one entity; and generating a modified view of the model based on the aggregated trust metric.

4. The computer-implemented method of claim 3, wherein the decay factor defines a percentage of trustworthiness according to a depth of a relationship defined between the first entity and at least one of the plurality of additional entities.

5. The computer-implemented method of claim 3, wherein the modified view comprises a simulated trustworthiness for at least one node in the plurality of nodes, the simulated trustworthiness being biased according to decay factor.

6. The computer-implemented method of claim 1, further comprising:

receiving, from the first entity, an API request to determine trustworthiness of at least one entity in the plurality of additional entities, the API request including at least one attribute;

generating, based on the API request and the at least one attribute, an aggregated trust metric for the at least one entity; and generating a modified view of the model based on the aggregated trust metric.

7. The computer-implemented method of claim 6, wherein the modified view comprises a simulated trustworthiness for at least one node in the plurality of nodes, the simulated trustworthiness being biased according to the at least one attribute.

8. The computer-implemented method of claim 7, wherein:

the aggregated trust metric represents a probability of the first entity being trustworthy; and the simulated trustworthiness modifies the probability.

9. The computer-implemented method of claim 1, further comprising:

receiving, from the first entity, an API request to access the representation of the model, transmitting an API response to the first entity, wherein the API response includes configuration information or state information for generating a view of the model in a user interface accessible to the first entity.

10. The computer-implemented method of claim 9, detecting, in the user interface, a requested modification to the view of the model, wherein the requested modification causes a localized change to at least one trust metric associated with at least one node in the plurality of nodes;

generating a modified view of the model based on the modification and the localized change to the at least one trust metric;

causing display of the modified view of the model in the user interface according to the localized change to the at least one trust metric.

11. The computer-implemented method of claim 10, wherein:

the modified view comprises a simulated trustworthiness for the at least one node.

12. The computer-implemented method of claim 1, wherein modifying the representation of the model according to one or more selectable contexts or attributes associated with one or more nodes of the plurality of nodes comprises:

biasing at least one trust metric defined for at least one node of the plurality of nodes; and depicting an indication adjacent to the one or more nodes, the indication depicting the bias of the at least one trust metric.

13. The computer-implemented method of claim 12, wherein:

the at least one trust metric comprises an interaction score or a willingness to interact score for an entity associated with the at least one node in the plurality of nodes; and the generated API enables the first entity to access and modify the representation of the model according to the interaction score or the willingness to interact score.

14. A system comprising:

at least one processing device; and memory storing instructions that when executed cause the at least one processing device to perform operations comprising:

obtaining a plurality of nodes associated with a first entity, wherein the plurality of nodes correspond to a plurality of additional entities, each the plurality of nodes being defined by both a trust metric and a relationship indication to the first entity or to another of the plurality of additional entities;

generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

15. The system of claim 14, wherein:

each node is a statement or entity associated with the first entity; and the model is a trust network comprising a plurality of neural networks configured to execute, in parallel, one or more activation functions to generate an aggregated trust metric for the first entity based on the trust metric and the relationship indication associated with each statement or entity.

16. The system of claim 14, wherein the operations further comprise:

receiving, from the first entity, an API request to determine trustworthiness of at least one entity in the plurality of additional entities, the API request including a decay factor;

generating, based on the API request and the decay factor, an aggregated trust metric for the at least one entity; and generating a modified view of the model based on the aggregated trust metric.

17. The system of claim 14, wherein the operations further comprise:

receiving, from the first entity, an API request to determine trustworthiness of at least one entity in the plurality of additional entities, the API request including at least one attribute;

generating, based on the API request and the at least one attribute, an aggregated trust metric for the at least one entity; and generating a modified view of the model based on the aggregated trust metric.

18. The system of claim 14, wherein the operations further comprise:

receiving, from the first entity, an API request to access the representation of the model, transmitting an API response to the first entity, wherein the API response includes configuration information or state information for generating a view of the model in a user interface accessible to the first entity.

19. The system of claim 14, wherein modifying the representation of the model according to one or more selectable contexts or attributes associated with one or more nodes of the plurality of nodes comprises:

biasing at least one trust metric defined for at least one node of the plurality of nodes; and depicting an indication adjacent to the one or more nodes, the indication depicting the bias of the at least one trust metric.

20. A non-transitory computer-readable medium comprising instructions, which when executed by at least one processor, cause the at least one processor to perform operations comprising:

obtaining a plurality of nodes associated with a first entity, wherein the plurality of nodes correspond to a plurality of additional entities, each the plurality of nodes being defined by both a trust metric and a relationship indication to the first entity or to another of the plurality of additional entities;

generating a model of the plurality of nodes based on the trust metric and the relationship indication to the first entity or to another of the plurality of additional entities; and generating, based on the generated model, an application programming interface (API) for accessing and modifying a representation of the model according to one or more selectable contexts or attributes associated with one or more of the plurality of nodes.

21. The non-transitory computer-readable medium of claim 20, wherein:

each node is a statement or entity associated with the first entity; and the model is a trust network comprising a plurality of neural networks configured to execute, in parallel, one or more activation functions to generate an aggregated trust metric for the first entity based on the trust metric and the relationship indication associated with each statement or entity.

22. The non-transitory computer-readable medium of claim 20, wherein the operations further comprise:

receiving, from the first entity, an API request to determine trustworthiness of at least one entity in the plurality of additional entities, the API request including a decay factor;

generating, based on the API request and the decay factor, an aggregated trust metric for the at least one entity; and generating a modified view of the model based on the aggregated trust metric.

23. The non-transitory computer-readable medium of claim 20, wherein the operations further comprise:

receiving, from the first entity, an API request to determine trustworthiness of at least one entity in the plurality of additional entities, the API request including at least one attribute;

generating, based on the API request and the at least one attribute, an aggregated trust metric for the at least one entity; and generating a modified view of the model based on the aggregated trust metric.

24. The non-transitory computer-readable medium of claim 20, wherein the operations further comprise:

receiving, from the first entity, an API request to access the representation of the model, transmitting an API response to the first entity, wherein the API response includes configuration information or state information for generating a view of the model in a user interface accessible to the first entity.

25. The non-transitory computer-readable medium of claim 20, wherein modifying the representation of the model according to one or more selectable contexts or attributes associated with one or more nodes of the plurality of nodes comprises:

biasing at least one trust metric defined for at least one node of the plurality of nodes; and depicting an indication adjacent to the one or more nodes, the indication depicting the bias of the at least one trust metric.

26. The non-transitory computer-readable medium of claim 25, wherein:

the at least one trust metric comprises an interaction score or a willingness to interact score for an entity associated with the at least one node in the plurality of nodes; and the generated API enables the first entity to access and modify the representation of the model according to the interaction score or the willingness to interact score.

* * * * *